US010765982B2

(12) United States Patent
Martin et al.

(10) Patent No.: US 10,765,982 B2
(45) Date of Patent: Sep. 8, 2020

(54) HELICAL WATER COLLECTOR

(71) Applicant: Hamilton Sundstrand Corporation, Charlotte, NC (US)

(72) Inventors: Luke Martin, Enfield, CT (US); Murtuza Lokhandwalla, South Windsor, CT (US); Sebastian Zuraw, Opole (PL); Maciej Ostrowski, Kamieniec Wroclawski (PL); Jaroslaw Rubalewski, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 225 days.

(21) Appl. No.: 16/018,659

(22) Filed: Jun. 26, 2018

(65) Prior Publication Data

US 2019/0388818 A1 Dec. 26, 2019

(51) Int. Cl.
| | |
|---|---|
| *B01D 45/16* | (2006.01) |
| *B04C 3/06* | (2006.01) |
| *B01D 45/08* | (2006.01) |
| *B64D 13/06* | (2006.01) |
| *B64D 13/08* | (2006.01) |
| *F24F 13/22* | (2006.01) |

(52) U.S. Cl.
CPC ............. *B01D 45/16* (2013.01); *B01D 45/08* (2013.01); *B04C 3/06* (2013.01); *B64D 13/06* (2013.01); *B64D 13/08* (2013.01); *F24F 13/222* (2013.01); *B64D 2013/0618* (2013.01); *F24F 2013/225* (2013.01)

(58) Field of Classification Search
CPC ............ B01D 45/12; B01D 45/16; B04C 3/06

USPC ........................................ 55/394, 396, 457
See application file for complete search history.

(56) References Cited

U.S. PATENT DOCUMENTS

| | | | |
|---|---|---|---|
| 3,989,489 A | 11/1976 | Van't Sant et al. | |
| 4,681,610 A | 7/1987 | Warner | |
| 6,524,373 B2 * | 2/2003 | Afeiche | B01D 45/16 55/396 |

(Continued)

FOREIGN PATENT DOCUMENTS

| | | |
|---|---|---|
| DE | 10230881 A1 | 2/2004 |
| EP | 1621243 A1 | 2/2006 |

(Continued)

OTHER PUBLICATIONS

The Extended European Search Report for Application No. 19182511. 6-1104; Report dated Oct. 30, 2019; Report Received Date: Nov. 11, 2019; 7 pages.

*Primary Examiner* — Robert A Hopkins
(74) *Attorney, Agent, or Firm* — Cantor Colburn LLP

(57) ABSTRACT

A water extractor including: an inlet; an outlet; a body including a helical passageway having an exit proximate the outlet and an entrance; an elbow connector enclosing a fluid passageway that fluidly connects the inlet to the entrance of the helical passageway, the elbow connector being bent at a selected angle and including an inner radius and an outer radius opposite the inner radius; and a baffle extending from proximate the inlet to the entrance and located within the fluid passageway of the elbow connector, the baffle being configured to partition the fluid passageway into a first fluid passageway proximate the inner radius of the elbow connector and a second fluid passageway proximate the outer radius of the elbow connector.

19 Claims, 3 Drawing Sheets

(56) References Cited

U.S. PATENT DOCUMENTS

| | | | |
|---|---|---|---|
| 7,266,958 | B2 | 9/2007 | Milde et al. |
| 10,525,485 | B2 * | 1/2020 | Monacchio ............... B04C 3/06 |

FOREIGN PATENT DOCUMENTS

| | | |
|---|---|---|
| EP | 2949880 A | 12/2015 |
| EP | 3320961 A1 | 5/2018 |
| EP | 3427809 A1 | 1/2019 |

* cited by examiner

HELICAL WATER COLLECTOR

BACKGROUND

The subject matter disclosed herein generally relates to the field of water extractors, and more particularly to method and apparatus for extracting water in aircraft air-conditioning systems.

In an aircraft air condition systems, moisture must be collected and drained from engine bleed air, or compressed ambient air, at a location downstream of a condenser to prevent re-entry into the cabin or air cycle machine where the moisture may cause damage. Existing air conditioning systems rely on forcing water particles into an inner diameter of a duct and into a scavenge flow area where the velocity of the water is decreased due to an increasing flow area of the scavenge flow area. An example of a prior art system can be found in U.S. Pat. No. 4, 681,610. Existing water extractors are necessarily large to account for the increasing scavenge flow areas. Existing water extractors are also made of multiple pieces that are often brazed, welded, and/or bonded, requiring numerous steps to assemble.

BRIEF SUMMARY

According to one embodiment, a water extractor is provided. The water extractor including: an inlet; an outlet; a body including a helical passageway having an exit proximate the outlet and an entrance; an elbow connector enclosing a fluid passageway that fluidly connects the inlet to the entrance of the helical passageway, the elbow connector being bent at a selected angle and including an inner radius and an outer radius opposite the inner radius; and a baffle extending from proximate the inlet to the entrance and located within the fluid passageway of the elbow connector, the baffle being configured to partition the fluid passageway into a first fluid passageway proximate the inner radius of the elbow connector and a second fluid passageway proximate the outer radius of the elbow connector.

In addition to one or more of the features described above, or as an alternative, further embodiments may include: a plurality of entrance vanes located at the entrance, each of the plurality of entrance vanes being configured to impart swirl upon a fluid that passes across the entrance vanes and enters the helical passageway.

In addition to one or more of the features described above, or as an alternative, further embodiments may include: a plurality of exit vanes located at the exit, each of the plurality of exit vanes being configured to straighten flow of a fluid that passes across the exit vanes exiting the helical passageway.

In addition to one or more of the features described above, or as an alternative, further embodiments may include that the second passageway is larger than the first passageway.

In addition to one or more of the features described above, or as an alternative, further embodiments may include that the body further includes: an outer wall; an inner wall disposed radially inward from the outer wall, the inner wall forming a main flow channel through a portion of the body; a helical wall extending between and connected to the outer wall and the inner wall, the helical wall forming the helical passageway; and a plurality of catchment orifices located within the outer wall.

In addition to one or more of the features described above, or as an alternative, further embodiments may include that the body further including: a drain manifold located radially outward from the outer wall, the drawing manifold being fluidly connected to the helical passageway through the catchment orifices.

In addition to one or more of the features described above, or as an alternative, further embodiments may include that the drain manifold encloses the outer wall.

According to another embodiment, an air conditioning system for an aircraft is provided. The air conditioning system including: a condenser; an air cycle machine; a water extractor including: an inlet fluidly connected to the condenser; an outlet fluidly connected to the air cycle machine; a body including a helical passageway having an exit proximate the outlet and an entrance; an elbow connector enclosing a fluid passageway that fluidly connects the inlet to the entrance of the helical passageway, the elbow connector being bent at a selected angle and including an inner radius and an outer radius opposite the inner radius; and a baffle extending from proximate the inlet to the entrance and located within the fluid passageway of the elbow connector, the baffle being configured to partition the fluid passageway into a first fluid passageway proximate the inner radius of the elbow connector and a second fluid passageway proximate the outer radius of the elbow connector.

In addition to one or more of the features described above, or as an alternative, further embodiments may include: a plurality of entrance vanes located at the entrance, each of the plurality of entrance vanes being configured to impart swirl upon a fluid that passes across the entrance vanes and enters the helical passageway.

In addition to one or more of the features described above, or as an alternative, further embodiments may include: a plurality of exit vanes located at the exit, each of the plurality of exit vanes being configured to straighten flow of a fluid that passes across the exit vanes exiting the helical passageway.

In addition to one or more of the features described above, or as an alternative, further embodiments may include that the second passageway is larger than the first passageway.

In addition to one or more of the features described above, or as an alternative, further embodiments may include that the body further includes: an outer wall; an inner wall disposed radially inward from the outer wall, the inner wall forming a main flow channel through a portion of the body; a helical wall extending between and connected to the outer wall and the inner wall, the helical wall forming the helical passageway; and a plurality of catchment orifices located within the outer wall.

In addition to one or more of the features described above, or as an alternative, further embodiments may include that the body further including: a drain manifold located radially outward from the outer wall, the drawing manifold being fluidly connected to the helical passageway through the catchment orifices.

In addition to one or more of the features described above, or as an alternative, further embodiments may include that the drain manifold encloses the outer wall.

According to another embodiment, a method of extracting water from an air conditioning system is provided. The method including: turning airflow a selected turn radius using an elbow connector bent to a selected angle; capturing condensate on an inner radius of the elbow connector using a baffle located within the elbow connector; drawing the airflow into an inlet of a helical passageway from the elbow connector, the helical passageway being configured to centrifugally rotate the airflow within the helical passageway; separating moisture from the airflow within the helical passageway using centrifugal forces; and collecting moisture from the airflow into a plurality of catchment orifices located in a radially outer wall of the helical passageway.

In addition to one or more of the features described above, or as an alternative, further embodiments may include: imparting a swirl upon the airflow drawn into the helical passageway using a plurality of entrance vanes located at the entrance.

In addition to one or more of the features described above, or as an alternative, further embodiments may include: straightening the airflow from the helical passageway using a plurality of exit vanes located at an exit of the helical passageway.

In addition to one or more of the features described above, or as an alternative, further embodiments may include: separating moisture from the airflow within the elbow connector using centrifugal forces at an outer radius of the elbow connector; and channelling moisture at the outer radius of the elbow connector to the helical passageway.

In addition to one or more of the features described above, or as an alternative, further embodiments may include: draining the moisture from each of the plurality of catchment orifices and into a drain manifold.

Technical effects of embodiments of the present disclosure include separating moisture using an elbow connector and a baffle internal to the elbow connector, prior to entering a helical passageway of a water extractor.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
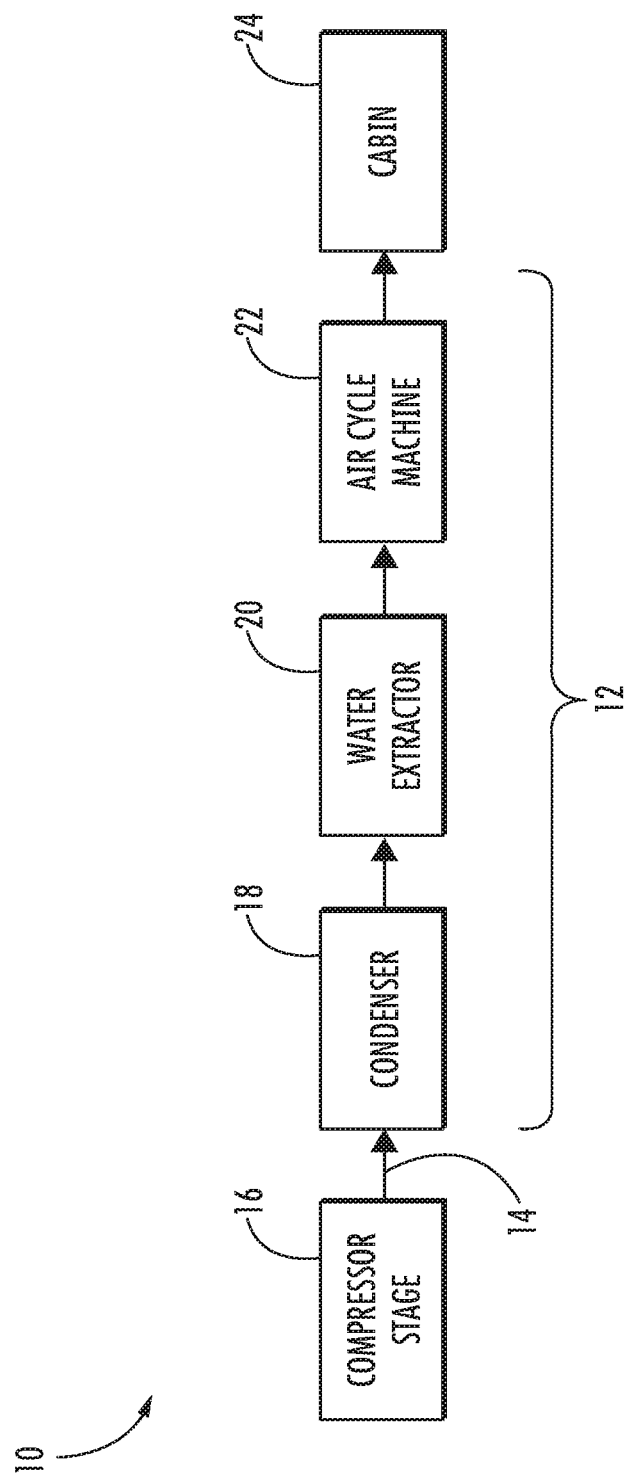
FIG. 1 is a schematic representation of airflow progression through an air conditioning system, according to an embodiment of the present disclosure.

FIG. 1 is a schematic representation of airflow progression 10 through an air conditioning system 12. The airflow progression 10 is a representation of bleed air 14 as it passes from a compressor stage 16, to an air conditioning system 12 (which includes condenser 18, water extractor 20, and air cycle machine 22), and onto a cabin 24. FIG. 1 is a simplified schematic representation of the system, highlighting the water extraction portion. All elements up stream of the condenser 18 and downstream of the water extractor 20 are not depicted.

The air conditioning system 12, is a sub-systems of an aircraft engine that conditions bleed air 14 so that bleed air 14 can be re-used to perform an additional function within the aircraft. The bleed air 14 is taken from a compressor stage 16 of the aircraft engine. In other non-limiting embodiment, the bleed air 14 can be compressed air taken from an ambient environment. The compressor stage 16 is an intermediate or high pressure stage within the aircraft engine. The condenser 18 is a heat exchanger for condensing moisture M into droplets. The water extractor 20 is an elongated tube of solid material with channels for extracting moisture M from bleed air 14. The air cycle machine 22 is a component of the air conditioning system 12 for controlling the temperature and pressure of bleed air 14 exiting from the air cycle machine 22 and into cabin 24. The cabin 24 is a compartment of the aircraft for housing passengers and equipment.

The compressor stage 16 fluidly connect to the condenser 18 via fluid lines or conduits in the aircraft. The condenser is fluidly connected to the water extractor 20. The water extractor 20 is fluidly connected to the air cycle machine 22, and the air cycle machine 22 is fluidly connected to the cabin 24.

During operation of the aircraft engine, bleed air 14 is drawn from the compressor stage 16 and into the condenser 18 of the air conditioning system 12. The condenser 18 condenses moisture M in the bleed air 14 from vapor into moisture M droplets. In some non-limiting embodiments, bleed air 14 can be conditioned by a heat exchanger in order to increase or decrease the temperature of the bleed air 14 exiting from the condenser 18. The bleed air 14, with the condensed moisture M droplets, is then transported to the air cycle machine 22. The air cycle machine 22 further conditions the bleed air 14 by altering the temperature and the pressure of the bleed air 14 to a level appropriate from the passengers in the cabin 24. A more detailed example of an aircraft air conditioning system and/or an environment control system can be found in U.S. Pat. No. 8,347,647B2.

Figure 2:
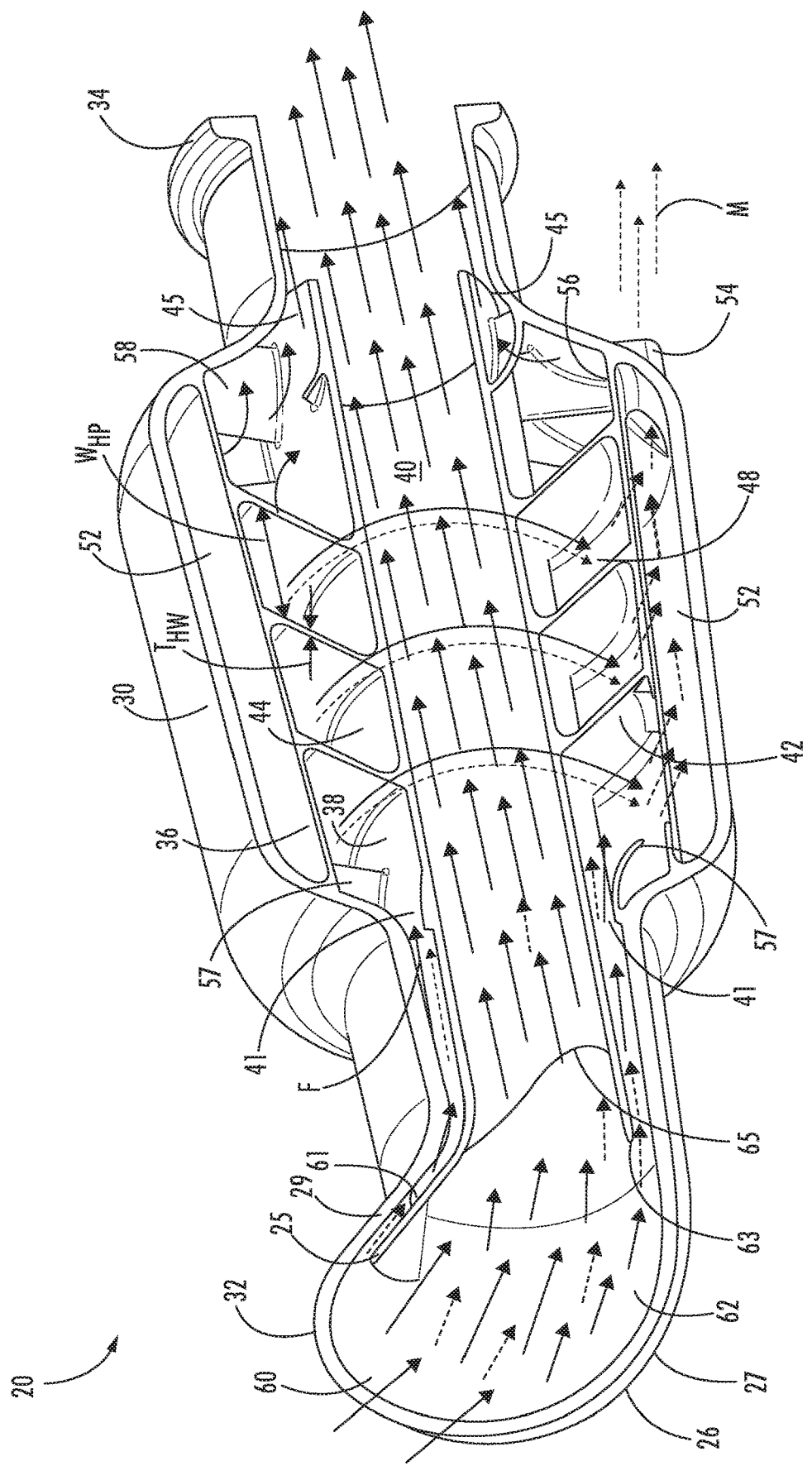
FIG. 2 illustrates a cutaway isometric view of a water extractor of the air conditioning system of FIG. 1, according to an embodiment of the present disclosure.

FIG. 2 is an isometric cutaway view of water extractor 20, according to an embodiment of the present disclosure. The water extractor 20 includes a body 30, an inlet 32, an elbow connector 26, an outlet 34, an outer wall 36, an inner wall 38, a main flow channel 40, an entrance 41, a helical wall 42, a helical passageway 44, an exit 45, a catchment orifices 48, a drain manifold 52, and exit ports 54. The outer wall 36 includes radially inner surface 56.

The body 30 also includes a plurality of entrance vanes 57 located proximate the entrance 41 of the helical passageway 44. The entrance vanes 57 are configured to direct and introduce a pre-swirling flow into the helical passageway 44 at an entrance 41 of the helical passageway 44. The body 30 further includes a plurality of exit vanes 58 located proximate an exit 45 of the helical passageway 44. The exit vanes 58 are configured to straighten the swirling flow from the helical passageway 44 at the exit 45.

The body 30 also includes a baffle 25 located proximate the inlet 32 of the water extractor 20 in the elbow connector 26 and extending to the entrance 41. The baffle 25 is configured to separate moisture M from airflow F within the elbow connector 25. The baffle 25 partitions the fluid passageway 60 within the elbow connector 26 into two separate passageways including a first passageway 61 and a second passageway 62. The first passageway 61 is an inner radial passageway located proximate to the inner radius 29 of the elbow connector 26. The second passageway 62 is an outer radial passageway located proximate to the outer radius 27 of the elbow connector 26. The baffle 25 may be located proximate the inner radius 29 of the elbow connector 26 to create a narrow passage for the first passageway 61. The first passageway 61 is configured to capture condensate moisture M that may form on the inner radius 29 of the elbow connector 26 and drop down into the passageway 60 of the elbow connector 26. The baffle 25 will channel the condensate through the first passageway 61 to the entrance 41 of the helical passageway 44. The second passageway 62 is configured to channel moisture M that separates from the airflow F as the airflow F attempts to make the turn radius in the elbow connector 26. The elbow connector 26 may be bent at a selected angle to create the turn radius for the airflow F within the fluid passageway 60. In an embodiment, the selected angle may be about 90 degrees. As the flow turns in the elbow connector 26, moisture M will separate from the airflow F and collect on the outer radius 27 of the elbow connector 26 and be channeled through the entrance 41 to the helical passageway 44. The first passageway 61 may be narrow and the second passageway 62 may be larger than the first passageway 61, as shown in FIG. 2. The baffle 25 may initiate proximate the inlet 32. In an embodiment, the baffle 25 is an extension of the inner wall 38. The baffle 25 is configured to capture condensate formed on the inner radius 29 of the elbow connector 26 and direct the condensate to the entrance 41. The baffle 25 initiates proximate the inlet 32 where the baffle 25 spans circumferentially around the fluid passageway 60 about 90° proximate the inner radius 29. Proximate an exit 63 of the elbow connector 26 the baffle 25 spans circumferentially around the fluid passageway 60 about 180° proximate the inner radius 29. Then the baffle 25 smoothly transitions from spanning circumferentially around the fluid passageway 60 about 180° to spanning circumferentially around the fluid passageway 60 about 360° to form the inner wall 38 at location 65 proximate the entrance 41.

The water extractor 20 may be a single piece of solid material such as aluminum, steel, titanium, polymer, or reinforced composite. The elbow connector 26 is bent pipe, tube, or conduit for the transmission of a fluid. The elbow connector 26 has an inner radius 29 of the bend and an outer radius 27 of the bend. As mentioned above, the elbow connector 26 may be bent to a selected angle. In an embodiment, the selected angle is about 90 degrees. The body 30 is an elongated piece of solid material with a generally tubular shape. The body 30 may have a generally conical or conical frustum shape, as show in FIG. 2. As the airflow F carrying water moves down the conical shape in the helical passageway 44, the expanding area of the conical shape within the helical passageway 44 causes the pressure to decrease and the airflow F to slow, which allows for water to separate from the airflow F. The outlet 34 is an opening of the body 30 disposed on a downstream (to the right in FIG. 2) end of the body 30. The outer wall 36 is an outer surface of the body 30 which extends circumferentially around the body 30. The inner wall 38 is an inner surface of the body 30, which includes a tubular shape. The main flow channel 40 is a flow channel or passageway. The entrance 41 of the helical passageway 44 is a gap between the outer wall 36 and the inner wall 38 and is located at an upstream end of the inner wall 38. The helical wall 42 is a helical shaped wall, or a wall in the shape of a helix, with thickness $T_{HW}$. The helical passageway 44 is a helical shaped passageway, or a passageway in the shape of a helix, with width $W_{HP}$. The thickness $T_{HW}$ of the helical wall 42 and width $W_{HP}$ of the helical passageway 44, as well as a cross-sectional shape of the helical passageway 44, may vary along any given point to create desired flow characteristics of the air through the helical passageway 44. The exit 45 of the helical passageway 44 is a gap or nozzle for fluid transfer. The exit 45 is formed between the downstream ends of the outer wall 36 and the inner wall 38. The catchment orifices 48 are slots or holes positioned along outer wall 36. The catchment orifices 48 fluidly connect the helical passageway 44 to the drain manifold 52. The drain manifold 52 is a collection basin or receptacle for the transmission of a fluid. The exit ports 54 are openings or orifices allowing fluid to exit the drain manifold 52. The radially inner surface 56 of the outer wall 36 is a surface of the outer wall 36 that faces radially inwards.

The elbow connector 26 fluidly connected to the helical passageway 44 via inlet 32. The elbow connector 26 is fluidly connected to condenser 18 or to another component of air conditioning system 12. The entrance vanes 57 are connected to or formed together with the inner wall 38 and/or the outer wall 36. The entrance vanes 57 extend radially outward from the inner wall 38 to the outer wall 36. The entrance vanes 57 also extend inwards from tube 26 in a direction that is offaxis from a main flow direction of inlet 57 and are configured to impart swirl upon a fluid, such as airflow F, that passes through the entrance 41 across the entrance vanes 57.

The exit vanes 58 are connected to or formed together with the inner wall 38 and/or the outer wall 36. The exit vanes 58 extend radially outward from the inner wall 38 to the outer wall 36. The exit vanes 58 also extend inwards from tube 26 in a direction that is offaxis from a rotational flow direction of helical passageway 44 and are configured to remove swirl of a fluid, such as airflow F, that passes across the exit vanes 58 and then out the exit 45.

The water extractor 20 is fluidly connected to the condenser 18 via the inlet 32 and to air cycle machine 22 via outlet 34. The inlet 32 and the outlet 34 are also fluidly connected to the main flow channel 40 and the helical passageway 44. The inner wall 38 is disposed radially within the outer wall 36 and is physically connected to the outer wall 36 via the helical wall 42. The main flow channel 40 is formed through a portion of the body 30 by an interior of inner wall 38. The entrance 41 forms an entrance to the helical passageway 44.

The helical wall 42 is connected to and extends between outer wall 36 and inner wall 38. The helical passageway 44 is formed by the space created by the helical wall 42. The drain manifold 52 is disposed radially outward from the helical passageway 44 and encloses the outer wall 36 of the helical passageway. The drain manifold 52 is fluidly connected to each of catchment orifices 48.

During operation of the air conditioning system 12, airflow F is transported from condenser 18 to water extractor 20 through the inlet 32. As airflow F enters through inlet 32, the airflow F is partitioned by the baffle 25 and a portion of airflow F is drawn into and through helical passageway 44 and another portion is drawn into and through main flow channel 40. Before airflow F enters the helical passageway, the elbow connector 26 causes moisture M in airflow F build up on the outer radius 27 of the elbow connector 26 due to centrifugal force and also on the inner radius 29 of the elbow connector 26 due to condensation. The baffle 25 enables the moisture M built up on the inner radius 29 and channeled directly to the helical passageway 44 through the entrance 41 and out away from the main flow channel 40. Since airflow F is swirling as airflow F enters helical passageway 44 due to the entrance vanes 57, the moisture M in airflow F is forced centrifugally in a radially outwards direction. Due to the swirling of airflow F, the portion of airflow F that enters the helical passageway 44 contains a high amount of the moisture M due to the helical passageway 44 being positioned radially outwards of the inner wall 38 and the main flow channel 40.

Airflow F enters into the helical passageway 44 through the entrance 41. As airflow F travels through and around the helical passageway 44, moisture M from airflow F is deposited in the form of moisture M droplets onto the radially inner surface 56 of the outer wall 36. The moisture M droplets deposited onto radially inner surface 56 of outer wall 36 are drawn in a downwards direction due to gravity and airflow F and enter catchment orifices 48 along helical passageway 44. The moisture M deposited onto radially inner surface 56 of outer wall 36 is collected in catchment orifices 48. The collected moisture M is then drained through the catchment orifices 48 and into drain manifold 52. The moisture M then empties from the drain manifold 52 through ports 54 due to gravity and the positioning of drain manifold 52 and ports 54 being positioned along the bottom of body 30 (towards a downward direction in FIG. 2). After the moisture M is drained into drain manifold 52 through the ports 54, the moisture M can be fed into a component or element that is fluidly attached to the drain manifold 52 through the port 54 such as a water recirculation, filtration, or cooling device.

After moisture M is removed form airflow F, airflow F continues through the helical passageway 44, to the end of the helical passageway 44 (to the right side of helical passageway 44 in FIG. 2), and is combined with airflow F flowing through main channel 40. Airflow F that flows through main channel 40 contains a higher velocity than airflow F coming out of helical passageway 44 through exit 45 which creates a pressure differential to draw or pull airflow F through and out of helical passageway 44 via exit 45. The exit vanes 58 straighten out the airflow F as the airflow is leaving the helical passageway 44 and combining with the airflow F that flowed through the main channel 40. Advantageously, straightening out the airflow F as the airflow F is leaving the helical passageway 44 reduces swirl and turbulence as the airflow F from the helical passageway 44 combines with the airflow F from the main channel 40, which reduces pressure loss of airflow F through the water extractor 20.

Advantageously, the water extractor 20 has three main points of water extraction. The first point of water extraction is by condensation on the inner radius 29 of the elbow connector, which is captured and channeled by the baffle 25. The second point of water extraction is by the centrifugal force separating moisture M from the airflow F at the outer radius 27 of the elbow connector. The third point of water extraction is the centrifugal force extracting moisture M from the airflow F within helical passageway 44 to drive moisture M particles to outer wall 36 and through the catchment orifices 48.

Figure 3:
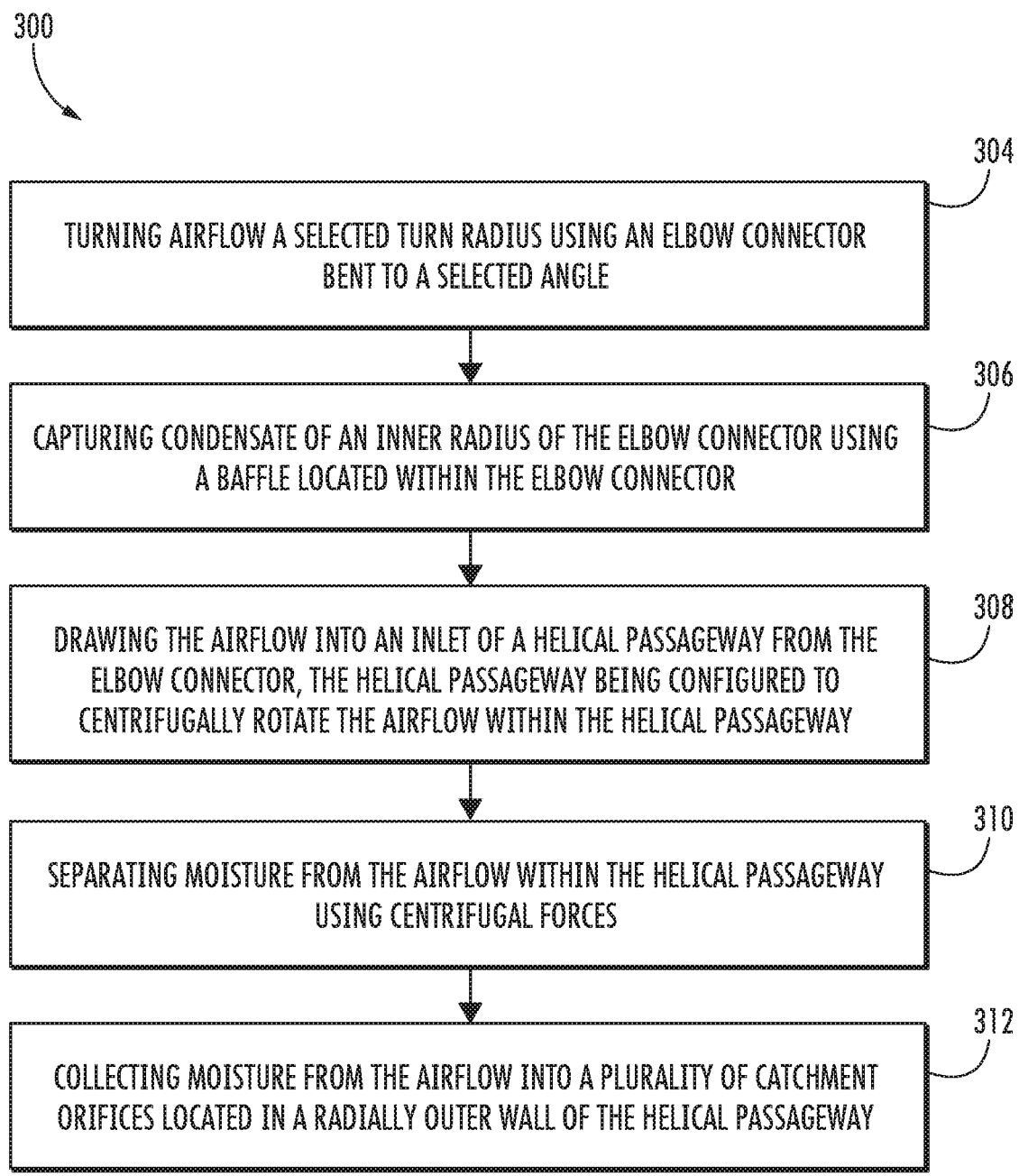
FIG. 3 is a diagram of a method of extracting water in an air conditioning system of an aircraft, according to an embodiment of the present disclosure.

Referring now to FIG. 3, with continued reference to FIGS. 1-2. FIG. 3 shows a method 300 of extracting water from an air conditioning system 12 of an aircraft. At block 304, airflow F is turned a selected turn radius using an elbow 26 connector bent to a selected angle. At block 306, condensate moisture M is captured on an inner radius 29 of the elbow connector 26 using a baffle 25 located within the elbow connector 26. Turning the airflow F a selected turn radius within the elbow connector 26 also separates moisture M from the airflow F within the elbow connector 26 using centrifugal forces at an outer radius 27 of the elbow connector 26.

Then the moisture M separated at the outer radius 27 of the elbow connector 27 may be channelled to the helical passageway 44 by the elbow connector 26.

At block 308, the airflow F is drawn into an inlet of a helical passageway 44 from the elbow connector 26. A swirl may be imparted upon the airflow F drawn into the helical passageway 44 using a plurality of entrance vanes 57 located at the entrance 41. Additionally, as flow exits the helical passageway 44, the airflow F from the helical passageway 44 may be straightened using a plurality of exit vanes 58 located at an exit of the helical passageway 44. The helical passageway 44, as discussed above, is configured to centrifugally rotate the airflow F within the helical passageway 44. At block 310, moisture M is separated from the airflow F within the helical passageway 44 using centrifugal forces. At block 312, the moisture M from the airflow F is collected into a plurality of catchment orifices 48. The method may also include that the moisture M is drained from each of the plurality of catchment orifices 48 and into a drain manifold 52.

While the above description has described the flow process of FIG. 3 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A water extractor, comprising:
   an inlet;
   an outlet;
   a body comprising a helical passageway having an exit proximate the outlet and an entrance;
   an elbow connector enclosing a fluid passageway that fluidly connects the inlet to the entrance of the helical passageway, the elbow connector being bent at a selected angle and including an inner radius and an outer radius opposite the inner radius; and a baffle extending from proximate the inlet to the entrance and located within the fluid passageway of the elbow connector, the baffle being configured to partition the fluid passageway into a first fluid passageway proximate the inner radius of the elbow connector and a second fluid passageway proximate the outer radius of the elbow connector.

2. The water extractor of claim 1, further comprising:
a plurality of entrance vanes located at the entrance, each of the plurality of entrance vanes being configured to impart swirl upon a fluid that passes across the entrance vanes and enters the helical passageway.

3. The water extractor of claim 1, further comprising:
a plurality of exit vanes located at the exit, each of the plurality of exit vanes being configured to straighten flow of a fluid that passes across the exit vanes exiting the helical passageway.

4. The water extractor of claim 1, wherein the second passageway is larger than the first passageway.

5. The water extractor of claim 1, wherein the body further comprises:
an outer wall;
an inner wall disposed radially inward from the outer wall, the inner wall forming a main flow channel through a portion of the body;
a helical wall extending between and connected to the outer wall and the inner wall, the helical wall forming the helical passageway; and
a plurality of catchment orifices located within the outer wall.

6. The water extractor of claim 5, wherein the body further comprising:
a drain manifold located radially outward from the outer wall, the drawing manifold being fluidly connected to the helical passageway through the catchment orifices.

7. The water extractor of claim 6, wherein the drain manifold encloses the outer wall.

8. An air conditioning system for an aircraft, the air conditioning system comprising:
a condenser;
an air cycle machine;
A water extractor comprising:
an inlet fluidly connected to the condenser;
an outlet fluidly connected to the air cycle machine;
a body comprising a helical passageway having an exit proximate the outlet and an entrance;
an elbow connector enclosing a fluid passageway that fluidly connects the inlet to the entrance of the helical passageway, the elbow connector being bent at a selected angle and including an inner radius and an outer radius opposite the inner radius; and
a baffle extending from proximate the inlet to the entrance and located within the fluid passageway of the elbow connector, the baffle being configured to partition the fluid passageway into a first fluid passageway proximate the inner radius of the elbow connector and a second fluid passageway proximate the outer radius of the elbow connector.

9. The air conditioning system of claim 8, further comprising:
a plurality of entrance vanes located at the entrance, each of the plurality of entrance vanes being configured to impart swirl upon a fluid that passes across the entrance vanes and enters the helical passageway.

10. The air conditioning system of claim 8, further comprising:
a plurality of exit vanes located at the exit, each of the plurality of exit vanes being configured to straighten flow of a fluid that passes across the exit vanes exiting the helical passageway.

11. The air conditioning system of claim 8, wherein the second passageway is larger than the first passageway.

12. The air conditioning system of claim 8, wherein the body further comprises:
an outer wall;
an inner wall disposed radially inward from the outer wall, the inner wall forming a main flow channel through a portion of the body;
a helical wall extending between and connected to the outer wall and the inner wall, the helical wall forming the helical passageway; and
a plurality of catchment orifices located within the outer wall.

13. The air conditioning system of claim 12, wherein the body further comprising:
a drain manifold located radially outward from the outer wall, the drawing manifold being fluidly connected to the helical passageway through the catchment orifices.

14. The air conditioning system of claim 13, wherein the drain manifold encloses the outer wall.

15. A method of extracting water from an air conditioning system, the method comprising:
turning airflow a selected turn radius using an elbow connector bent to a selected angle;
capturing condensate on an inner radius of the elbow connector using a baffle located within the elbow connector;
drawing the airflow into an inlet of a helical passageway from the elbow connector, the helical passageway being configured to centrifugally rotate the airflow within the helical passageway;
separating moisture from the airflow within the helical passageway using centrifugal forces; and
collecting moisture from the airflow into a plurality of catchment orifices located in a radially outer wall of the helical passageway.

16. The method of claim 15, further comprising:
imparting a swirl upon the airflow drawn into the helical passageway using a plurality of entrance vanes located at the entrance.

17. The method of claim 15, further comprising:
straightening the airflow from the helical passageway using a plurality of exit vanes located at an exit of the helical passageway.

18. The method of claim 15, further comprising:
separating moisture from the airflow within the elbow connector using centrifugal forces at an outer radius of the elbow connector; and
channelling moisture at the outer radius of the elbow connector to the helical passageway.

19. The method of claim 15, further comprising:
draining the moisture from each of the plurality of catchment orifices and into a drain manifold.

* * * * *